US011172263B2

(12) United States Patent
Wittke

(10) Patent No.: US 11,172,263 B2
(45) Date of Patent: *Nov. 9, 2021

(54) SYSTEMS AND METHODS FOR PLAYBACK OF CONTENT USING PROGRESS POINT INFORMATION

(71) Applicant: Rovi Guides, Inc., San Jose, CA (US)

(72) Inventor: David Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,982

(22) Filed: Sep. 22, 2020

(65) Prior Publication Data
US 2021/0076100 A1 Mar. 11, 2021

Related U.S. Application Data

(63) Continuation of application No. 16/352,686, filed on Mar. 13, 2019, now Pat. No. 10,820,056.

(51) Int. Cl.
| H04N 21/2387 | (2011.01) |
| H04N 21/472 | (2011.01) |
| H04N 21/442 | (2011.01) |
| H04N 21/45 | (2011.01) |
| H04N 21/845 | (2011.01) |

(52) U.S. Cl.
CPC . *H04N 21/47217* (2013.01); *H04N 21/44222* (2013.01); *H04N 21/4524* (2013.01); *H04N 21/4532* (2013.01); *H04N 21/8456* (2013.01)

(58) Field of Classification Search
CPC ....... H04N 21/47217; H04N 21/44222; H04N 21/4524; H04N 21/4532; H04N 21/8456
See application file for complete search history.

(56) References Cited

U.S. PATENT DOCUMENTS

| 8,229,888 | B1 | 7/2012 | Roskind |
| 8,924,999 | B1 | 12/2014 | Santangelo |
| 9,009,794 | B2 | 4/2015 | Dykeman |
| 9,179,199 | B2 | 11/2015 | Alsina |
| 9,386,352 | B1 * | 7/2016 | Shoykhet ........... H04N 21/8456 |

(Continued)

FOREIGN PATENT DOCUMENTS

| EP | 2495934 | 9/2012 |
| WO | WO2000058967 | 10/2000 |
| WO | WO2018213004 | 11/2018 |

OTHER PUBLICATIONS

PCT International Search Report in International Applicatio No. PCT/US2020/022116, dated May 27, 2020 (12 pages).

*Primary Examiner* — Thai Q Tran
*Assistant Examiner* — Jose M Mesa
(74) *Attorney, Agent, or Firm* — Haley Guiliano LLP

(57) ABSTRACT

The systems and methods are described herein for playback of content based on progress point information. The systems and methods detect nearby media devices to transmit or request progress point information. Based on the communicated progress point information, the system may generate an option to play back content at a point within the content up to which content was last consumed. When content providers offer different versions of one content item and the user does not select to play back content from the content provider associated with the progress point information, the system determines a proper playback point in other content providers.

20 Claims, 8 Drawing Sheets

(56) References Cited

U.S. PATENT DOCUMENTS

| | | |
|---|---|---|
| 2005/0125821 A1 | 6/2005 | Li |
| 2008/0060043 A1* | 3/2008 | Malik .............. H04N 21/41407 |
| | | 725/134 |
| 2011/0307930 A1 | 12/2011 | Rouse |
| 2012/0160065 A1 | 6/2012 | Frenken |
| 2013/0031162 A1 | 1/2013 | Willis |
| 2013/0077940 A1* | 3/2013 | Shackleton .............. H04N 5/91 |
| | | 386/249 |
| 2013/0188923 A1 | 7/2013 | Hartley |
| 2014/0130099 A1 | 5/2014 | Kunisetty |
| 2014/0282755 A1 | 9/2014 | Alsina |
| 2016/0234346 A1 | 8/2016 | Degani |
| 2016/0345187 A1 | 11/2016 | Adderly |
| 2017/0155958 A1* | 6/2017 | Fu ........................... H04L 67/42 |
| 2018/0014071 A1 | 1/2018 | Richman |
| 2019/0238928 A1 | 8/2019 | Filmeyer |
| 2019/0306581 A1 | 10/2019 | Her |
| 2020/0296468 A1 | 9/2020 | Wittke |
| 2020/0296469 A1 | 9/2020 | Wittke |
| 2020/0359059 A1 | 11/2020 | Zhang et al. |

* cited by examiner

SYSTEMS AND METHODS FOR PLAYBACK OF CONTENT USING PROGRESS POINT INFORMATION

CROSS-REFERENCE TO RELATED APPLICATION

This application is a continuation of U.S. patent application Ser. No. 16/352,686, filed Mar. 13, 2019. The disclosure of which is hereby incorporated by reference herein in its entity.

BACKGROUND

The present disclosure is directed to generating playback of content at proper progress points, and more particularly, to communicating progress point information between media devices to synchronize progress point information associated with different user profiles on the respective media devices.

SUMMARY

Content today is accessed through a variety of devices and in various situations. In some situations, content is watched on a single device by multiple users. For example, two users may start watching content together using the first user's Netflix account. If the second user later wishes to resume playback using his Netflix account when alone, he cannot because his account has not stored the playback point where the users last watched together. In another situations, a user watches the same content from multiple content providers at different times. For example, the user may watch a movie on Netflix, pause watching before the end of the movie, and resume watching the same content on Hulu later. In conventional systems, content providers, unaware of the progress that a user has made consuming the content from other providers or user profiles, will not play back content from a user's most recent progress point. This can cost users time finding the correct point to resume playback of content, especially in view of the increasing number of content providers and ways to consume content in a social or group environment.

Systems and methods are described herein for playback of content based on progress point information communicated between media devices. In one embodiment, a media device generates an option to display content based on progress point information that it requests from another media device within its proximity. To source the progress point information, the requesting media device detects other media devices within a predefined proximity (e.g., a predefined distance) as the media device. The system gives options to the user to select a media device from which progress point information should be requested. In response to a user selection of a desired media device, the user's media device transmits a request for progress point information to the desired media device. The request can include information such as the requesting device or the content for which progress point information is requested. After the request is approved (e.g., authorized by the desired media device or through a service provider), the system will provide the media device with progress point information that can be used to resume playback of the content from the point to which it was last watched with the user of the desired media device.

To detect other media devices within a proximity of a media device, the system may process Global Positioning System (GPS) data to correlate a location with a time that a certain media device was at that location. The location of the media devices is determined using GPS data, and the system concludes the media devices are within proximity of each other by determining that the distance between the two devices at some time satisfies a predefined distance threshold. As described more fully below, the system may employ other techniques for detecting proximate devices including short-range wireless communication, image recognition, inaudible sound transmission, infrared light communication, etc.

In some embodiments, exchanging progress point information is done between media devices without user involvement. A media device periodically broadcasts periodic requests for progress point information to nearby media devices which receive these requests in the background of their current operation (e.g., presenting content to users). To prevent interrupting the users at the requested media devices, requests are authorized in response to determining that the requesting media device is a pre-authorized media device instead of in response to user input. The system maintains a list of pre-authorized media devices according to a history of devices that progress points have been shared with, a list that the user has composed manually, or a list of the contacts stored in memory of the media device. Once the progress point information has been shared, the requesting media device determines whether to store the progress point information or not. In circumstances where the progress point information is out-of-date, progress point information will not be stored on the requesting device. The system determines if the progress point information is outdated based on a predefined time threshold. This allows the system to maintain relevant progress point information.

Users commonly possess more than one media device to consume content and may decide to switch devices when consuming content with a group of users. When the progress point information associated with the content is requested, users will not want to receive outdated progress point information from a media device that was initially used but switched away from. Because the system tracks the time progress point information was generated for content, in some embodiments, progress point information is determined to be outdated and therefore, not transmitted to or stored within requesting media devices.

In some embodiments, to resume playback at the appropriate times on content offered by different content providers, progress point information must be reconciled among the different content providers. Because the same content may be offered by multiple content providers (e.g., Netflix and YouTube), the content provider used to resume playing content may be different from the one on which it was originally consumed. Under circumstances when the current content provider and the original content provider offer different versions of the content (e.g., scenes have been edited out), the system reconciles the playback times from the different content providers based on segment identifiers (e.g., a fingerprint for scenes within a movie) to determine the correct time to begin playback of content from the current content provider.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION OF THE DRAWINGS

Methods and systems are described herein for synchronizing progress point information (e.g., a data structure identifying content and a timestamp indicating progress of the user's consumption of that content) among users consuming content in a group.

Figure 1:
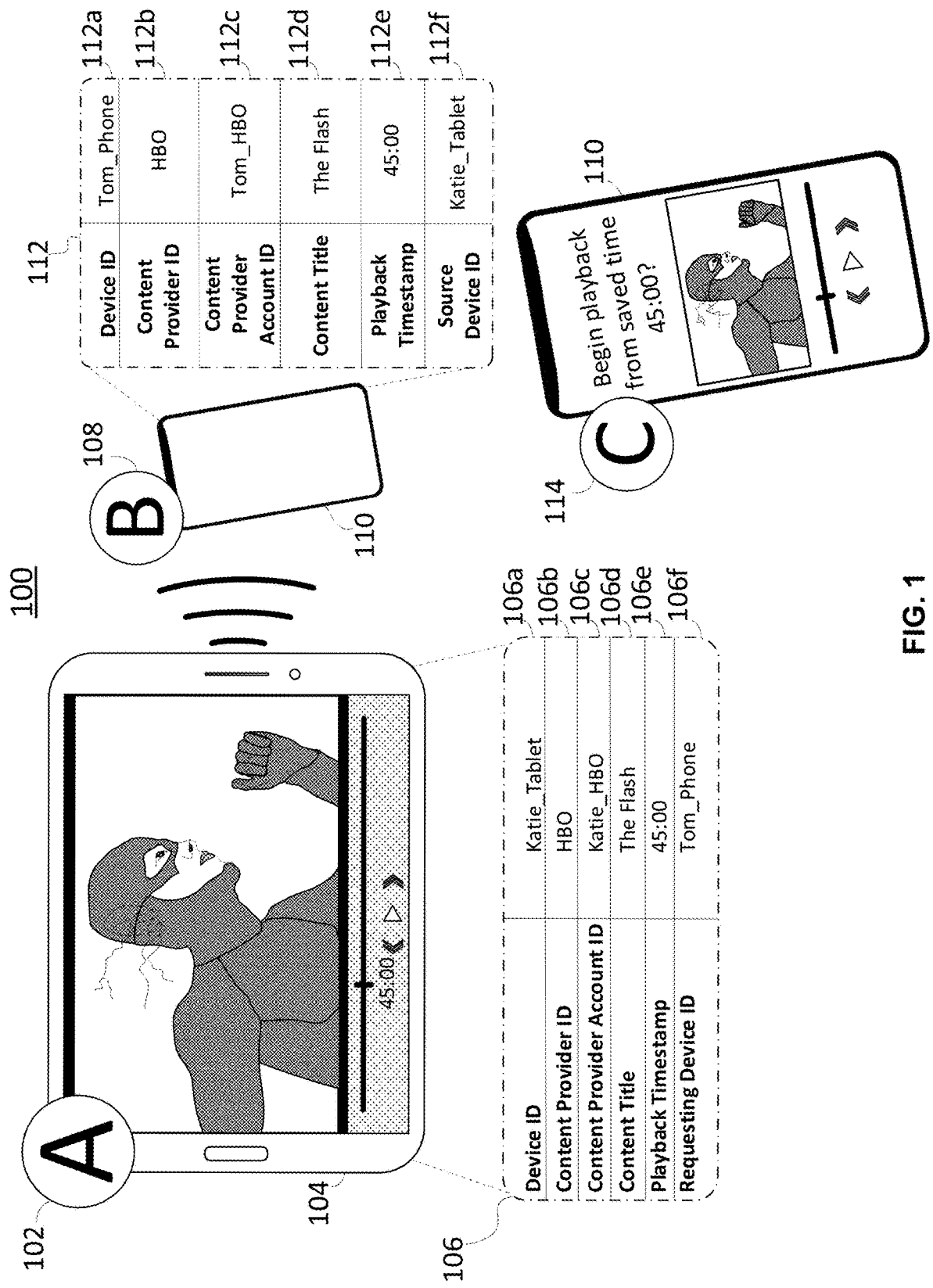
FIG. 1 shows an illustrative progress point synchronization system storing a progress point, in accordance with some embodiments of the disclosure.

FIG. 1 shows an illustrative progress point synchronization system 100 storing a progress point, in accordance with some embodiments of the disclosure. At timepoint A 102, media device 104 is generating content for display (e.g., a movie) associated with progress point information 106. Media device 104 may be a smart television, a mobile device (e.g., a tablet, smartphone, laptop), or any suitable electronic computing device capable of generating content for consumption. A progress point may refer to a timestamp indicating the consumption progress of the content. A media device on which the user is watching a movie at the 45:00-minute mark may receive a request for progress point information from another device that is within proximity. Progress point information communication is not limited to instances when a user has requested the information (e.g., a "pull" for information). Rather, it may also be pushed to other users through a sharing feature. The system, in order to process the received request, may pause the playback of the movie in order to prompt the user to authorize sharing progress point information with the other device. As described more fully here, in some embodiments the system may process the received request in the background of other operations without disturbing content playback).

At timepoint B 108, media device 104 may then share progress point information 106 with media device 110. Progress point information 106 may then be stored onto media device 110 or stored to a remote server for access by media device 110. The metadata fields stored onto media device 110 may correspond to progress point information 112. At timepoint C 114, the system may generate an option to display, on media device 110, the previously viewed content on media device 104 beginning from the timestamp stored in progress point information 112.

As depicted in FIG. 1, media device 104 is generating content. However, progress point synchronization is not limited to being implemented on media devices generating content. Progress points may also be synchronized for previously generated content. The content depicted in system 100 is a movie, but it will be understood that "content" may refer to any suitable content with video, audio, or a combination of video and audio. The movie generated by media device 104 is shown as being paused at a playback timestamp of 45:00, i.e., 45 minutes from the beginning of the movie. The playback timestamp may be stored in a metadata field in progress point information 106, which may comprise metadata fields such as "Device ID" field 106a, "Content Provider ID" field 106b, "Content Provider Account ID" field 106c, "Content Title" field 106d, "Playback Timestamp" field 106e, and "Requesting Device ID" field 106f.

The "Device ID" field 106a may be user-specified, automatically populated by the system with a unique identification number, or a combination of the two. For example, a user associated with media device 104 selected her "Device ID" to be "Katie_Tablet" and the system registers the user-selected value in addition to assigning a unique identification number to avoid conflicts with other devices of the same name.

The "Content Provider ID" field 106b is a unique ID assigned to a content provider (e.g., by the Federal Communications Commission). The content provider of the movie presented on media device 104 is Home Box Office (HBO), as indicated by the "Content Provider ID" field 106b value "HBO."

The "Content Provider Account ID" field 106c is a unique ID assigned to each user by the content provider that the respective user is subscribed to. Not all "Content Provider Account ID" fields will be populated. Depending on the content provider, the user may not have an account associated with the content provider. For example, broadcast television networks such as The American Broadcasting Company (ABC) provide their content without requiring a user to pay for a subscription account to access their content.

The title of the movie presented on media device 104 is "The Flash," populated accordingly in "Content Title" field 106d. Additional metadata fields in progress point information 106 may specify an episode, series, or season number to further identify the content in addition to its title (e.g., an episode of a television series may have a title, season number, and episode number).

Playback timestamps are recorded in the "Playback Timestamp" field 106e. The value in "Playback Timestamp" field 106e may be populated with a current playback timestamp or with the most recent playback timestamp. For example, the current playback timestamp of the movie presented on media device 104 is depicted in FIG. 1 as 45:00 and is reflected in "Playback Timestamp" field 106e. In instances where progress point information is requested when the media devices are not actively or currently generating content (e.g., previously consumed content), the system may access stored progress point information. The most recent playback timestamp may be stored in each set of progress point information for previously consumed content. For example, if the user of media device 104 wants to share progress point information 106 an hour after the user has stopped watching "The Flash" at the 45:00-minute mark, the progress point information 106, with metadata fields 106a through 106f populated as depicted in FIG. 1, will be stored for sharing.

Progress point information 106 may be stored on local memory of media device 104 or accessed at a remote server by media device 104. Portions of the progress point information 106 may be provided by a content provider (e.g., the content provider ID, title of content, and the content provider account ID) and may be accessed by the media device from a remote server hosted by the content provider.

At timepoint B 108, media device 110 is receiving progress point information 106 after sending a request to media device 104 for the information. To make this request, the user of media device 110 may be required, by system 100, to be within a predefined proximity of media device 104. A proximity may involve a range of distance, audio strength (e.g., decibels), radio frequency (RF) signal strength (e.g., signal-to-noise ratio), biometric identification (e.g., facial recognition) or any suitable measurement of physical proximity to a media device.

In some embodiments, the system may determine proximity based on users instead of based on location of media devices. For example, the system uses biometric identification described above to identify that a user is within proximity of a media device that is generating content, determine that the user is pre-authorized to access progress point information, and receive requests from the user's media device to store progress point information when the user returns to his own media device (e.g., receive a request via a remote server when the media devices are not within range of each other). In some embodiments, the user is logged into a media device. The phrase "logged into a media device" may be understood to mean that an account (e.g., service provider account) has been accessed on the media device. For example, logging into the service provider account on a media device allows progress point information to be established when the user consumes media.

In some embodiments, the system uses media devices to determine proximity. For example, media device 104 has RF communications circuitry to determine its current location based on Global Positioning System (GPS) signals. Media device 110 may use its RF communications circuitry to determine its current location to transmit to media device 104 when requesting progress point information 106. Media device 110 may determine that media device 104 is within a predefined distance (e.g., 5 meters) of the current location of media device 110, and hence, within the predefined proximity.

In another example, media device 110 may use audio strength to determine if media device 104 is within a proximity to transmit a request to receive progress point information 106. Media device 110 may detect audio produced by media device 104 through an embedded microphone. Upon determining the strength of the produced audio, measured in decibels, media device 110 may determine that media device 104 is within the predefined proximity.

In another example, the system may use RF strength to determine whether user of media device 110 is within a predefined proximity of media device 104. Media device 110 and media device 104 may engage in a handshake to determine the signal strength of the two wireless paths between the two RF communications circuitries (e.g., the wireless channel from media device 110 to media device 104 and vice versa). Media device 104 may broadcast an initial RF signal to alert nearby devices to transmit an acknowledgment RF signal in return. Media device 104 controls the transmit power of the initial RF signal such that only devices within a predefined distance receive the initial RF signal having the corresponding transmit power. Control of transmit power allows the user to specify a customizable range within which to scan for media devices, taking into consideration the appropriate power transmission rules set by the FCC. For example, media device 110 allows the user options to scan for devices within five meters or 15 meters, depending on the transmit power used. Media device 110 may implement an electronically scanned array or beamforming to direct its initial RF signal to detect devices in a particular direction (e.g., only devices that are directly in front of the user). Media device 110 may detect multiple media devices within a proximity and may provide the user an option to select which of the media devices the request for progress point information should be sent to (e.g., send only to media device 104).

In another example, the system may use biometric identification to determine if the user of media device 110 is nearby media device 104. A camera embedded in media device 104 may capture an image of the user. Biometric identification processes such as facial recognition, iris recognition, or a combination of the two may be used to identify the user. The user's identity may be associated with media device 110 or a user profile. The association may be applicable when media device 104 responds to a request from media device 110 for progress point information 106. The system may, therefore, use the biometric identification to identify a profile of a user that is pre-authorized to receive progress point information from the media device.

In response to the determination that media device 104 is within the predefined proximity, media device 110 may transmit a request for progress point information 106. The request may comprise information identifying the requesting device such as a Device ID.

After receiving the request from media device 110 for progress point information 106, media device 104 may authorize the source of the request (e.g., the user or the media device). Authorization may be done manually (e.g., prompting the user to select whether content device 110 is allowed to access progress point information 106) or automatically. Automatic authorization may be implemented with a list of pre-authorized users. For example, the system 100 automatically grants access to progress point information 106 to users who are saved as contacts on media device 104. Media device 110, after being authorized, may receive progress point information 106 either directly from media device 104 or through a remote server. In some embodiments, authorization may occur at a remote server without interaction with media device 104. For example, the system provides a web interface on which a user might preauthorize other users to access progress point information using identifying information (e.g., email address, full name, phone number, user name, etc.).

Progress point information 106 may be stored as progress point information 112 under the same or different metadata fields. The system may store progress point information 112 on local memory of media device 110 or on a remote server. Progress point information 112 comprises metadata fields indicative of the information being received from another media device. While metadata fields like "Device ID" field 112a, "Content Provider ID" field 112b, "Content Provider Account ID" field 112c, "Content Title" field 112d, and "Playback Timestamp" field 112e may contain similar information as their respective metadata fields sourced from progress point information 106, there may be additional metadata fields populated in response to the completed request. For example, media device 110 stores the value for "Source Device ID" field 112e with the "Device ID" field 106a value (e.g., "Source Device ID" is "Katie_Tablet").

There may be a metadata field in each set of progress point information that indicates which users or media devices were within a proximity when content was generated for consumption. For example, progress point information 106 has a metadata field (not depicted in FIG. 1) called "Group Viewing Users" that may list "Tom_Phone" in response to detecting that Tom's phone was within proximity of media device 104. As depicted in FIG. 1, metadata fields in progress point information 106 and progress point information 112 are understood to be only a portion of the possible metadata fields.

At timepoint C 114, media device 110 may generate an option, based on stored progress point information 112, to present the content that was previously presented on media device 104. As depicted in FIG. 1, media device 110 generates an option to display the movie that was previously displayed on media device 104 starting from a time determined by "Playback Timestamp" field 112e (e.g., a playback time of 45:00).

Figure 2:
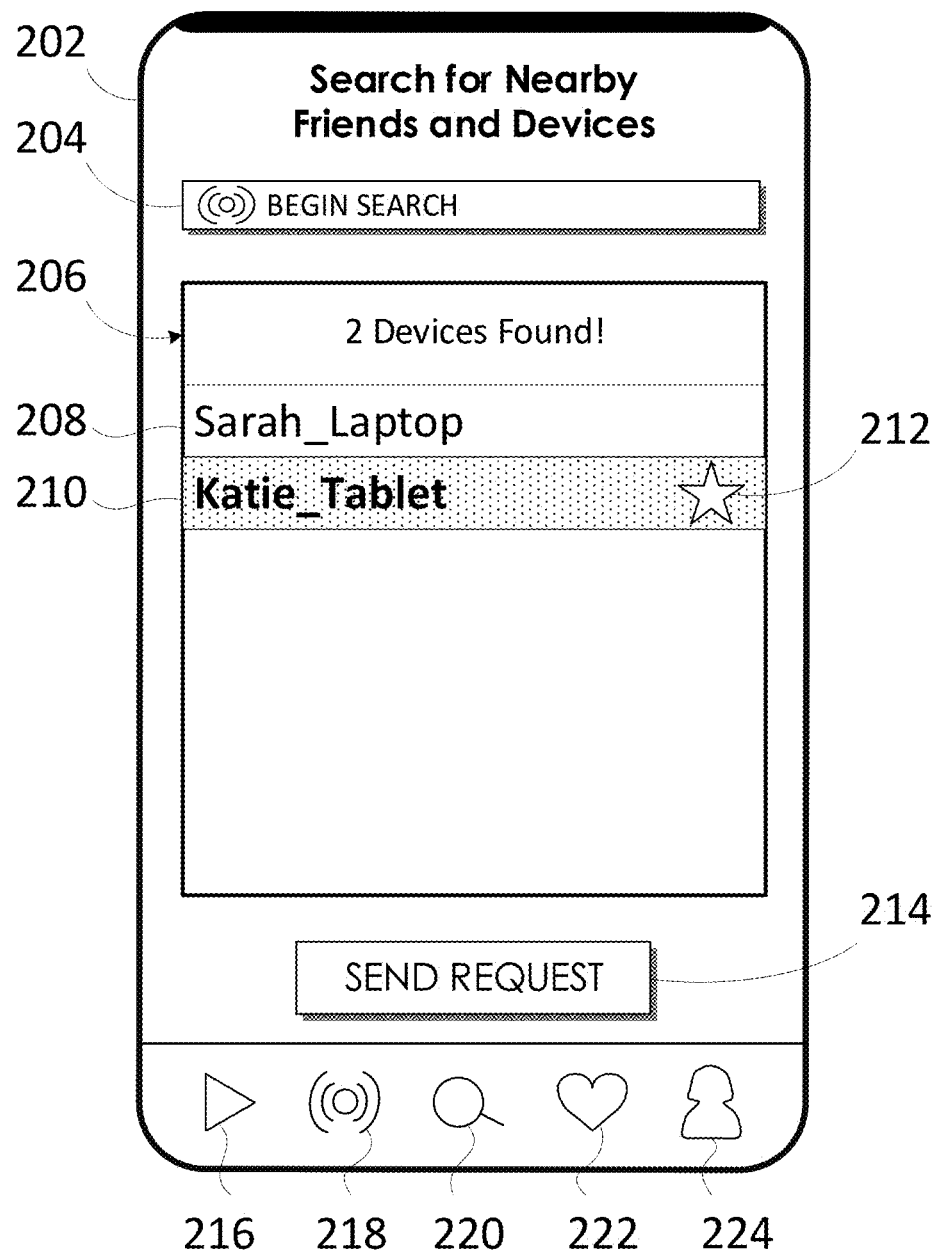
FIG. 2 shows an illustrative user interface for presenting detected devices within proximity of a media device, in accordance with some embodiments of the disclosure.

FIG. 2 shows an illustrative user interface 200 for presenting detected devices within proximity of media device 202, in accordance with some embodiments of the disclosure. User interface 200 allows a user to search for media devices within a proximity of media device 202, view results of the search, and select a media device to send a request for progress point information to. Media device 202 is depicted in FIG. 2 as a smartphone. However, media device 202 is not limited to smartphones and may be any electronic computing device capable of generating content for consumption.

Search for media devices within a proximity of media device 202 may begin with a selection of search initialization button 204. In response to the user selection to begin searching, media device 202 may use any of the proximity-determining methods described in the description of FIG. 1 to discover nearby media devices. The results of the search are displayed in results box 206. As depicted in FIG. 2, the progress point synchronization system has discovered two media devices in proximity of media device 202: a first media device with ID 208 "Sarah_Laptop" and a second media device with ID 210 "Katie_Tablet." Media devices displayed in results box 206 have visual attributes applied to user interface 200 to indicate a property associated with the respective media device. For example, the second media device with ID 210 has a visual attribute 212 of a star icon to indicate that media device 202, or the user using media device 202, is pre-authorized to receive progress point information associated with the second media device. This may mean that, upon the user selecting the request button 214, the media device 202 receives progress point information from the second media device with ID 210 without prompting its user, Katie, to authorize the request.

Media devices displayed in results box 206 may also appear in user interface 200 with a message indicating that the respective media devices are currently generating content. For example, Sarah's laptop with ID 208 idles on a screen saver while Katie's tablet is currently generating "The Flash" for Katie and Tom. In this example, the system may generate a message or display a visual attribute (e.g., a "play" icon similar to the icon of playback option 216) to reflect that Katie's tablet is currently generating content. Similarly, the system may display a different visual attribute to indicate media devices that are not currently generating content (e.g., the same "play" icon with an "X" overlaid). If the user selects the media device with ID 208, the system may generate a message explaining that the media device selected is not currently generating content but prompts the user to select a content item which Sarah and he have previously viewed together in the past. This would be a valid progress point information request. When the user of media device 202 selects the second media device with ID 210, user interface 200 may highlight the selection to show visual confirmation of the user's selection. Finally, the user may send the request for progress point information to the selected media device using request button 214.

User interface 200 may provide the user access to multiple functions aside from searching for nearby media devices. A menu in user interface 200 may provide playback option 216 to resume playing content, device search option 218 to search for nearby media devices, viewing history search option 220 to browse stored progress point information for previously consumed content, favorites option 222 to bookmark a subset of previously watched content for ease of access, and user profile option 224 to access the account information associated with a logged-in user.

Playback option 216 may provide the user with an interface to play back content. User interface 200 may redirect the user to a playback interface when the user selects content in the viewing history interface or the favorites interface shown upon selecting viewing history search option 220 and favorites option 222, respectively. At the playback interface, the system may present the user the option to confirm beginning playback of content from a certain timestamp. The system may provide multiple timestamps to the user including the stored timestamp in the progress point information, the beginning of the content, timestamps corresponding to highlights in the content (e.g., home runs in a baseball game), timestamps determined based upon the number of users requesting playback, or any suitable combination thereof.

For example, the system determines that content will be played back, through media device 202, to multiple users in a viewing group. The determination may be done by detecting users within a proximity of media device 202 using the proximity-determining methods described in the description of FIG. 1. Upon detecting users within proximity of media device 202, the system may retrieve progress point information associated with the media devices of each user in the viewing group. Media device 202 may prompt the user with the list of timestamps corresponding to the playback times at which each user last watched this content. For example, playback interface shows a list of times 45:00, 20:00, and 56:25 reflecting the playback times that the respective users last watched "The Flash." The user may have an option to select one of the times, or the system may determine one to start from. In one instance, the system determines to resume playback from the earliest time in the list of timestamps.

For instances when multiple users in a viewing group are requesting playback of a content item on device 202, the system may determine a playback time based on highlights that are of interest to all users. For example, progress point information retrieved associated with each user includes saved timestamps indicative of times within the content that were of interest to the user. The system may compare the saved timestamps for the respective users to find a common timestamp or a timestamp that is within range of the saved timestamps corresponding to scenes of interest. If there are no common timestamps but the time difference between the earliest and latest timestamps is less than a threshold time difference (e.g., within 5% of the overall play length of the content), the system may choose to resume playback from the earliest timestamp. For example, users Katie and Tom have bookmarked timestamps 30:03 and 30:15 in "The Flash." Although the two timestamps are not the same (12 seconds apart), the system may determine that the two timestamps correspond to the same scene of interest because the time difference is only 12 seconds, which is less than a predetermined threshold time difference of one minute.

Device search option 218 may provide the user with an interface to search for nearby media devices. One such interface is user interface 200 as depicted in FIG. 2. Results of the search may be listed according to device identifier, content currently being watched by the media devices nearby, any suitable descriptor identifying progress point information, or any combination thereof. For example, user interface 200 lists detected media devices within a proximity according to contents that are being generated on the respective media devices (e.g., a list comprising "The Flash," "60 Minutes," and "Peppa Pig" corresponding to the content being watched on devices within a house). In some instances, a user may request progress point information from the most recent media device used to consume content. For example, if Tom had requested progress point information from Katie's tablet, but Katie had continued watching with Tom more recently on her laptop, the system recommends that Tom request the more up-to-date progress point information. Further in this example, the system may determine that progress point information is out-of-date and not store the progress point information. This determination may be done by analyzing whether a certain amount of time has passed between when the content stopped being generated and a request for associated progress point information was made. Returning to the earlier example, if the system on Tom's smartphone had received Katie's outdated progress point information, the system may perform a check of the time between when the progress point was created (e.g., a metadata field within the progress point information may provide a timestamp for the time of day of creation) and the time the request was made. When the system determines that the time difference is greater than a predefined period of time (e.g., 24 hours), the system may decide not to store the progress point information to the smartphone's local memory or to a remote server. The system may also generate a notification to the user with options to store or ignore the outdated progress point information.

Viewing history search option 220 may provide the user with an interface to search through viewing history of previously consumed content. The viewing history search interface may further provide options to resume playback of previously consumed content. The options may include a list of content sources currently or shortly providing the content. An example of this interface is depicted in FIG. 3.

Favorites option 222 may provide an interface to view a subset of previously consumed content. For example, the subset corresponds to content that the user has selected as a favorite. The favorites interface may also allow the user to access bookmarked timestamps within a content corresponding to scenes in the content that the user may be interested in returning to. In the playback interface, viewing history search interface, favorites interface, or any combination thereof, the system may present the user with an option to share progress point information for at least one of the content items.

User profile option 224 may provide an interface for the user to access account information or edit user preferences. The user profile interface may list content provider accounts that the user is subscribed to (e.g., a Netflix subscription). The user profile interface may further list media devices that are pre-authorized. For example, media device 202 has a contact list stored to local memory that the system accesses to determine which requests for progress point information are authorized without prompting the user to authorize the requests.

Figure 3:
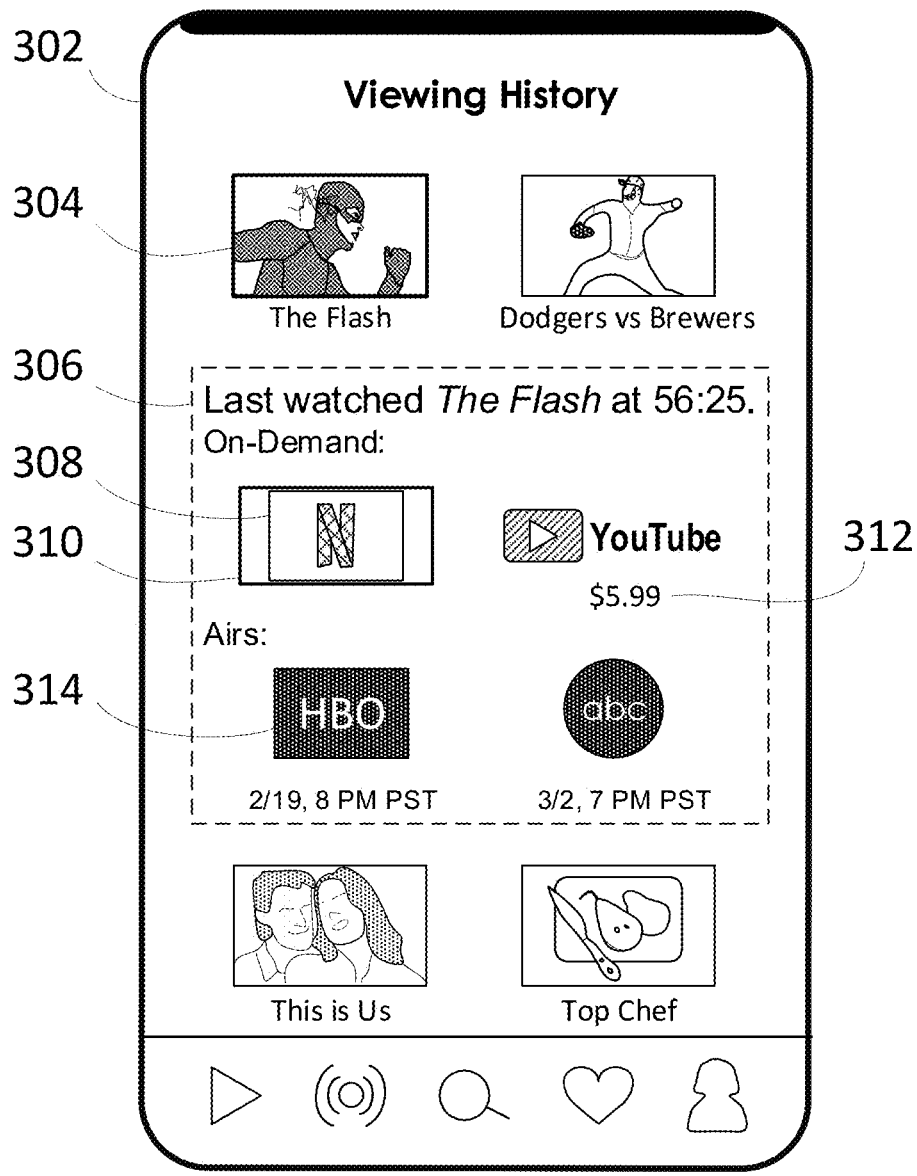
FIG. 3 shows an illustrative user interface for searching previously consumed content, in accordance with some embodiments of the disclosure.

FIG. 3 shows an illustrative user interface 300 for searching previously consumed content, in accordance with some embodiments of the disclosure. Media device 302 may present previously consumed content such as movies, sporting events, and television shows as depicted in FIG. 3. However, content is not limited to audiovisual media, and includes audio-only or video-only content. For example, user interface 300 also presents a list of songs or podcasts that the user has previously listened to. User interface 300 shows that the user has selected the content thumbnail 304 corresponding to a movie entitled "The Flash." This selection may prompt a detailed display of the progress point information associated with the selected content. For example, display 306 indicates that the user previously stopped watching "The Flash" at the 56:25-minute mark, which may be information obtained from a metadata field in stored progress point information.

The progress point synchronization system may determine content providers offering the content and generate options to resume playback of the content. Media device 302 may be communicatively coupled with content provider servers from which the system may retrieve content availability and scheduling data to display. The system determines which on-demand content providers offer a particular piece of content (e.g., "The Flash") and generate the options on a media device display to allow the user to select an on-demand content provider. For example, display 306 provides the user with options to select the on-demand content providers such as Netflix (option 308) and YouTube, that the system has determined offer "The Flash." The system may also determine, through the communications network between media device 302 and a content provider server, if the account that the user has logged into media device 302 with is associated with a paid subscription to the content provider. To accomplish this, the system may prompt the user to provide account information, such as a user ID and password, or any suitable security credentials, to transmit to a content provider server. The content provider server may authorize the system to access its content provider data (e.g., subscription status, subscription information). As a result, the system may determine which content providers the user has a subscription to and apply a visual attribute to distinguish a subscribed content provider from other content providers. For example, display 306 includes a box 310 around option 308 because the system has determined that, of the content providers offering "The Flash," the user is subscribed to Netflix. Access to content provider data is not limited to being from content providers that the user is subscribed to and authorized to access. The system may transmit a request for content provider data without security credentials to receive data for non-subscribers (e.g., the cost of subscription or a one-time fee for a content item). For example, display 306 shows that YouTube offers "The Flash" for a fee 312 of $5.99. Display 306 further provides live-broadcasting content provider options such as HBO (option 314) and ABC. If the user selects a live-broadcasting content provider, the system may alert the user at or before the time of the broadcast to assist the user to watch the content on time. The system may automatically select one of the content providers based on user preferences. For example, if the user specifies a preference to consume content with existing content provider subscriptions, the system automatically begins playback from Netflix. In another example, if the user specifies a preference to purchase content from the lowest-priced content provider option, the system may automatically prompt the user to enter purchasing information for the cheapest option. For example, if the user does not have a Netflix subscription when presented with user interface 300, the system prompts the user to purchase the content from YouTube because a Netflix subscription is $12 per month while the one-time YouTube fee 312 for "The Flash" is only $5.99.

Figure 4:
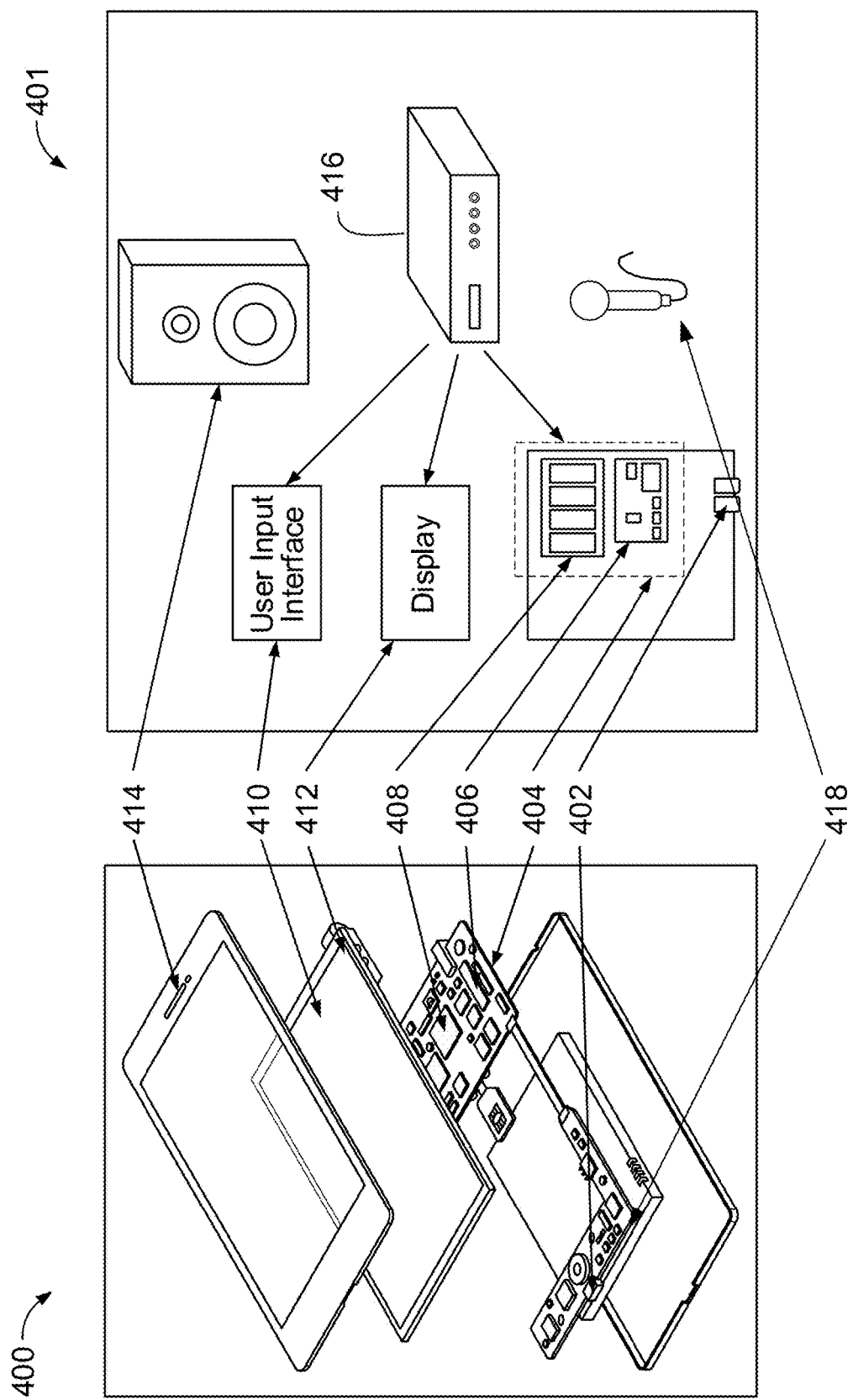
FIG. 4 is a block diagram of an illustrative media device, in accordance with some embodiments of the disclosure.

Users may access content for output from one or more of their devices. FIG. 4 shows generalized embodiments of an illustrative media device such as media device 104 or media device 110. For example, media device 104 is a smartphone device or a remote control. In another example, device 104 may be a user television equipment system. User television equipment system 104 may include a set-top box 416. Set-top box 416 may be communicatively coupled to speaker 414, microphone 418, and display 412. In some embodiments, display 412 may be a television display or a computer display. In some embodiments, set top box 416 may be communicatively coupled to user interface input 410. In some embodiments, user interface input 410 may be a remote control device. Set-top box 416 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of devices are discussed below in connection with FIG. 5. Each one of device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to detect that a user is within a predefined distance of media device 400. In some implementations, any action performed by control circuitry 404 may be based on instructions received from the application.

In client/server-based embodiments, control circuitry 404 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, content associated with stored progress point information. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores progress point information, mapping information for reconciling playback timestamps between content from different content providers (e.g., mapping one scene, identified by a segment identifier, of a movie to the 45:00-minute mark on Netflix's version and to the 35:00-minute mark on ABC's version), user preferences, bookmarked timestamps associated with content, or any suitable reference for control circuitry to retrieve when presenting content based on progress point information, or any suitable combination thereof.

Control circuitry 404 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touchscreen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414. Microphone 418 may be provided as integrated with other elements of each one of device 400 and user equipment system 401 or may be a stand-alone unit. Microphone 418 may be any suitable device capable of receiving and converting sound into an electrical audio signal (e.g., digital or analog). Microphone 418 may receive sounds made by users as well as the audio component of content that is played through speakers 414. Device 400 may include an embedded microphone 418 integrated with control circuitry 404. Microphone 418 outputs the audio signal to control circuitry 404. Control circuitry 404 may monitor the audio signal to compare with determined audio strength of sounds made by users to determine whether a user is within proximity of device 400.

The content application may be implemented using any suitable architecture. For example, it may be a stand-alone application wholly implemented on each one of device 400 and user equipment system 401. In such an approach, instructions for the application are stored locally (e.g., in storage 408), and data for use by the application is downloaded on a periodic basis (e.g., from an out-of-band feed, from an Internet resource, or using another suitable method). Control circuitry 404 may retrieve instructions for the application from storage 408 and process the instructions to generate any of the displays discussed herein. Based on the processed instructions, control circuitry 404 may determine what action to perform when input is received from input interface 410.

In some embodiments, the application is a client/server-based application. Data for use by a thick or thin client implemented on each one of device 400 and user equipment system 401 is retrieved on demand by issuing requests to a server remote from each one of device 300 and user equipment system 401. In one example of a client/server-based content application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive audio signals from the user via microphone 418 and transmit the audio signals to the remote server for processing.

In some embodiments, the content application is downloaded and interpreted or otherwise run by an interpreter or virtual machine (run by control circuitry 404). In some embodiments, the content application may be encoded in the ETV Binary Interchange Format (EBIF), received by control circuitry 404 as part of a suitable feed, and interpreted by a user agent running on control circuitry 404. For example, the content application may be an EBIF application. In some embodiments, the content application may be defined by a series of JAVA-based files that are received and run by a local virtual machine or other suitable middleware executed by control circuitry 404. In some of such embodiments (e.g., those employing MPEG-2 or other digital media encoding schemes), the content application may be, for example, encoded and transmitted in an MPEG-2 object carousel with the MPEG audio and video packets of a program.

Figure 5:
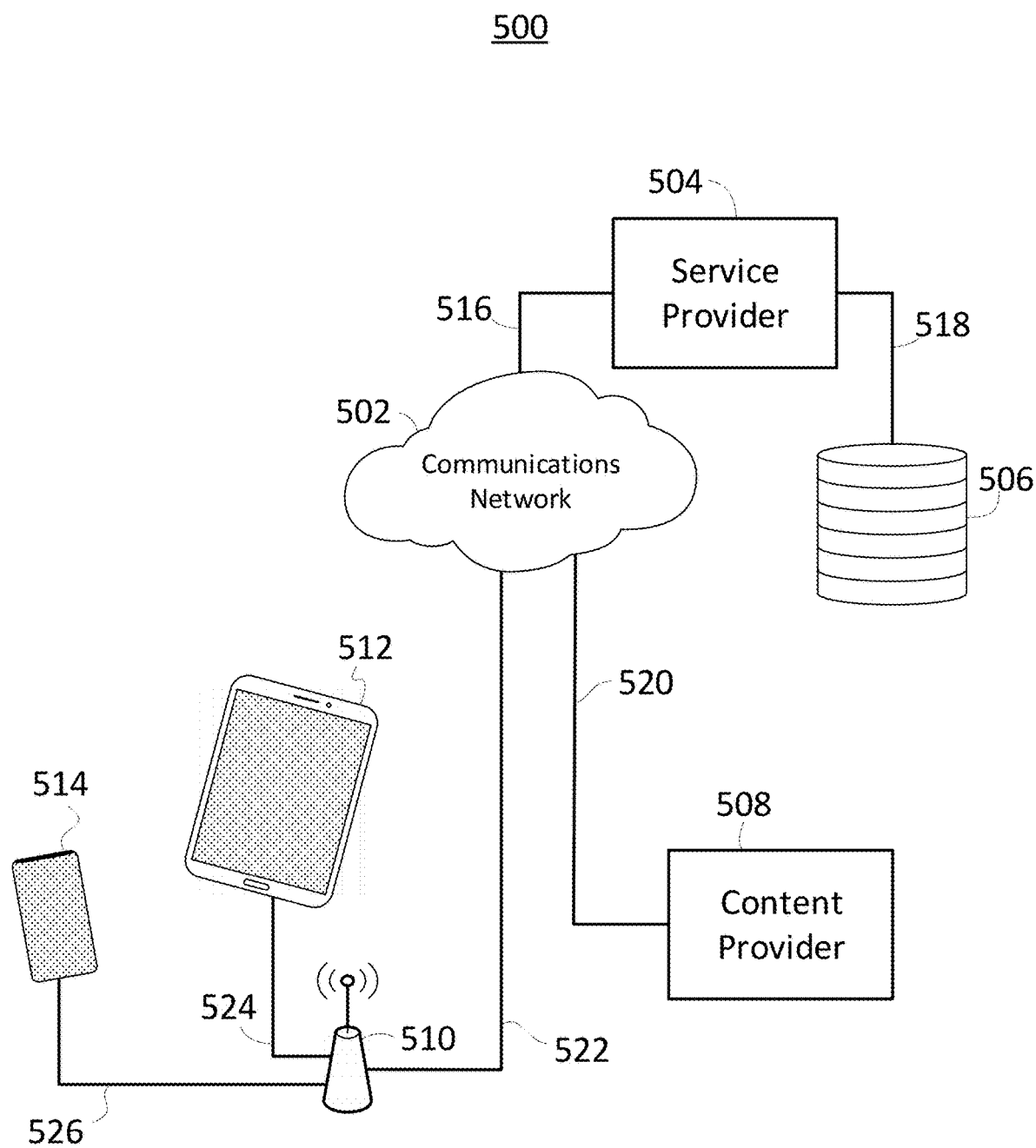
FIG. 5 is a block diagram of an illustrative progress point synchronization system, in accordance with some embodiments of the disclosure.

FIG. 5 is a block diagram of an illustrative progress point synchronization system 500, in accordance with some embodiments of the disclosure. Components of system 500 are connected via communications network 502. Communications network 502 may be one or more networks including the Internet, a mobile phone network, mobile voice or data network (e.g., a 4G or LTE network), cable network, public switched telephone network, or other types of communications network or combinations of communications networks. Communications network 502 is communicatively coupled to service provider 504 through communication link 516, and service provider 504 is communicatively coupled to a database 506 through communication link 518. Links 516 and 518 may separately or together include one or more communication paths, such as, a satellite path, a fiber-optic path, a cable path, a path that supports Internet communications (e.g., IPTV), free-space connections (e.g., for broadcast or other wireless signals), or any other suitable wired or wireless communication path or combination of such paths. In some instances, service provider 504 may provide service data including progress point information, user account information, content consumption history, previously detected media devices, and user preferences. Service data may be stored in database 506 for access by service provider 504.

System 500 includes content provider 508 that is communicatively coupled to communications network 502 via communication link 520. Link 520 includes any of the communication paths described above in connection with paths 516 and 518. There may be more than one of each of content provider 508, but only one of each is shown in FIG. 4 to avoid overcomplicating the drawing. Content provider 508 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content provider 508 may be the originator of content (e.g., a television broadcaster, a Webcast provider, etc.) or may not be the originator of content (e.g., an on-demand content provider, an Internet provider of content of broadcast programs for downloading, etc.). Content provider 508 may include cable sources, satellite providers, on-demand providers, Internet providers, over-the-top content providers, or other providers of content. Content provider 508 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content provider 508 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels. In some embodiments, content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may also include subscription data. For example, the subscription data may identify to which sources or services a given user subscribes and/or to which sources or services the given user has previously subscribed but later terminated access. In some embodiments, content data from content provider 508 may be provided to user's equipment using a client/server approach. For example, a user equipment device may pull content data from a server, or a server may push content data to a user equipment device. In some embodiments, a content application client residing on the user's equipment may initiate sessions with content provider 508 to obtain content data when needed, e.g., when the content data is out-of-date or when the device requests the data. Content data may be provided to the user equipment with any suitable frequency (e.g., continuously, daily, at user-specified intervals, at system-specified intervals, in response to a request from user equipment, etc.)

Content and/or content data delivered to user computer device 512 and wireless user communications device 514 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, and Hulu, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 500 is intended to illustrate a number of approaches, or network configurations, by which devices and sources of content and content data may communicate with each other for the purpose of accessing content and providing the ability to modify content in response to user engagement. The embodiments described herein may be applied in any one or a subset of these approaches, or in a system employing other approaches for delivering content. The following three approaches provide specific illustrations of the generalized example of FIG. 5.

In one approach, devices may communicate with each other within a home network. Devices may communicate with each other directly via short-range point-to-point communication schemes described above, via indirect paths through a hub or other similar device provided on a home network, or via communications network 502. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may transmit content from user computer equipment to a portable video player or portable music player. As another example, a portable media device may transmit progress point information to user television equipment to begin playback on a larger screen for group viewing.

In a second approach, users of devices inside and outside a home use their application to communicate directly with content source 416 to access content. Specifically, users with television equipment and computer equipment, both connected to communications network 502 although not depicted this way in the drawing, within a home may access the application to navigate among and locate desirable content. Users may also access the application outside of the home using user portable devices such as computer device 512 or wireless user communications device 514 to navigate among and locate desirable content.

In a third approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud includes a collection of server computing devices, which may be located centrally or at distributed locations, that provide cloud-based services to various types of users and devices connected via a network such as the Internet via communications network 502. These cloud resources may include one or more content providers 508. In addition, or in the alternative, the remote computing sites may include other devices, such as computer device 512 or wireless user communications device 514. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services may be provided in the cloud through cloud computing service providers, or through other providers of online services. For example, the cloud-based services include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device streams audio from one cloud resource while downloading audio visual content from a second cloud resource. Or a user device downloads content from multiple cloud resources for more efficient downloading. In some embodiments, devices use cloud resources for processing operations such as the processing operations performed by processing circuitry described in relation to FIG. 4.

Each one of device 400 and user equipment system 401 of FIG. 4 may be implemented in system 500 as user computer device 512, wireless user communications device 514, or any other type of user equipment suitable for accessing content. Devices, on which an application may be implemented, may function as stand-alone devices or may be part of a network of devices. In system 500, there are typically more than one of each type of device but only one of each is shown in FIG. 5 to avoid overcomplicating the drawing. In addition, each user may utilize more than one type of device and also more than one of each type of device. Devices 512 and 514 may be communicatively coupled to communications network 502 directly. However, as depicted in FIG. 5, devices 512 and 514 are communicatively coupled indirectly through intermediary communication point 510. Intermediary communication point 510 may be a wireless access point, a cable modem, WiFi router, cellular tower, any suitable communications device capable of receiving and transmitting telecommunications signals, or a combination thereof. Although communications between content provider 508 and devices 512 and 514 are shown as through communications network 502, in some embodiments, content provider 508 may communicate directly with devices 512 and 514 via communication paths (not shown) such as those described above in connection with paths 516 and 518.

In some embodiments, a device (e.g., user computer device 512 or wireless user communications device 514) may be referred to as a "second device." For example, a second device may provide an interface for adjusting settings and display preferences of the first device. In some embodiments, the second device is configured for interacting with other second devices or for interacting with a social network. The second device may be located in the same room as the first device or a different room from the first device but in the same house or building. The progress point synchronization system active on the first device may determine the proximity of the user of the second device based on a predefined distance that the first device is from the second device.

Although communications paths are not drawn between devices, these devices may communicate directly with each other via communication paths, such as those described above in connection with paths 516 and 518, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC.

Any one or more of device 400 and user equipment system 401 of FIG. 4 and user computer device 512 and wireless user communications device 514 of FIG. 5 may be used to store, share, or request progress point information to resume playback of content based on the progress point information. For example, the devices of the present disclosure request progress point information from a second device in response to detecting that its user is within a proximity of the second device. Further details of the present disclosure are discussed below in connection with the flowcharts of FIGS. 6-8.

Figure 6:
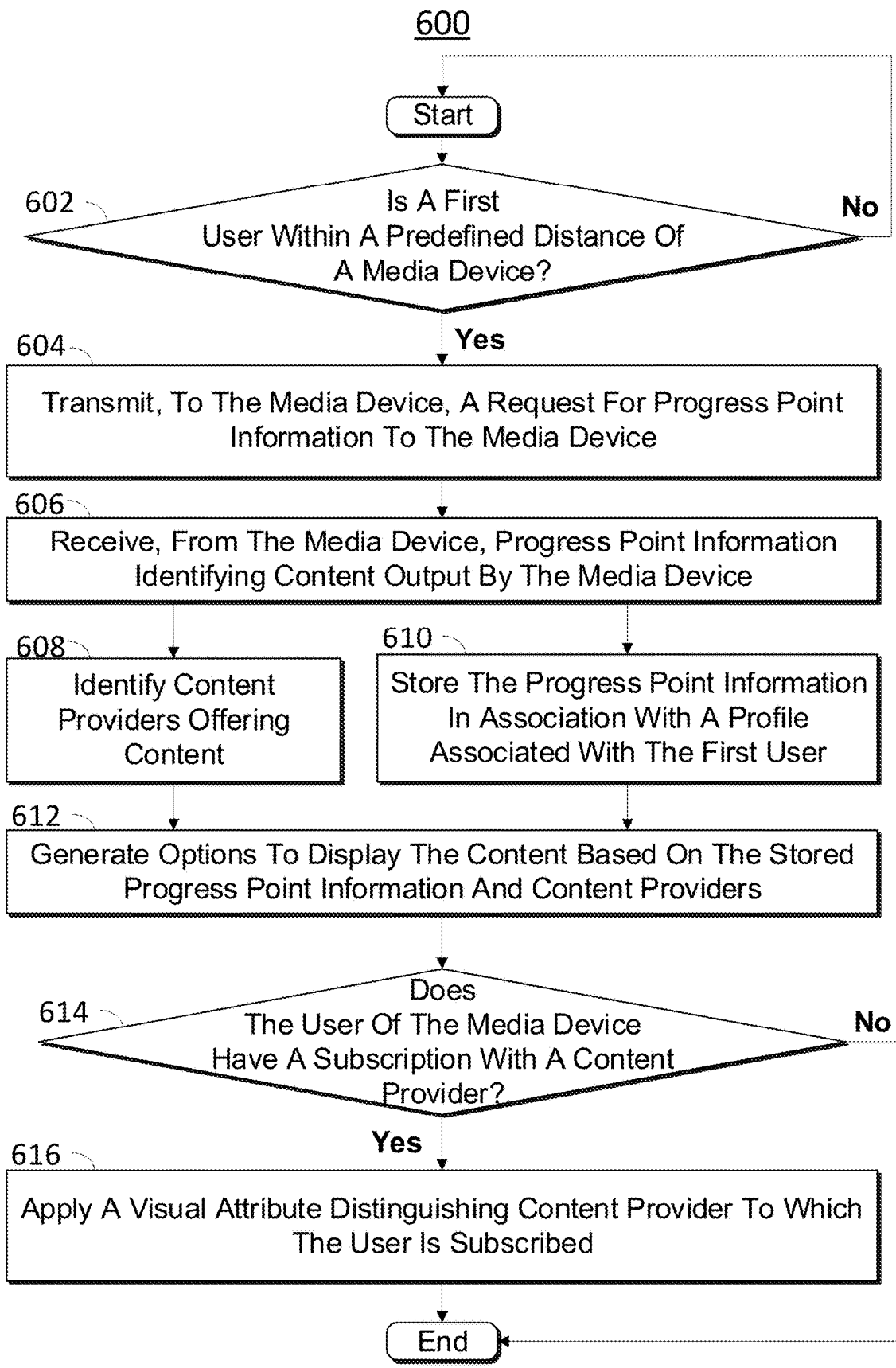
FIG. 6 depicts an illustrative flowchart of a process for synchronizing progress point information, in accordance with some embodiments of the disclosure.

FIG. 6 depicts an illustrative flowchart of a process 600 for synchronizing progress point information, in accordance with some embodiments of the disclosure. It should be noted that the steps of process 600 may be performed by control circuitry 404 of FIG. 4, or any of the system components shown in FIGS. 1-5. Control circuitry 404 may be a part of media devices 104, 110, 202, or 302, part of a remote server separated from the user equipment by way of a communications network (e.g., communications network 502 of FIG. 5), or distributed over a combination of both.

At step 602, the system determines if a first user is within a predefined distance of a media device. In process 600, the system uses distance as a measure of proximity, but any of the proximity detection methods described in the description of FIG. 1 may be implemented. The system may determine that there is a first user, Katie, near a media device, where Katie is not the same person as the user, Tom, of the media device. Rather, Katie may have her own media device, a tablet, that may be used when detecting that she is within a predefined distance of Tom's media device, a smartphone. For example, by using the GPS systems enabled on both the tablet and the smartphone, the system determines that Katie is near Tom's smartphone, which may involve assuming that Katie is at the same location as her tablet. If the system detects that Katie is within a predetermined proximity of Tom's smartphone, it may proceed to step 604. However, if the system determines that there is no user within proximity of Tom's smartphone, the system will not depart from current operations to receive or send a request for progress point information. The system may wait until it receives a user selection responsive to a button such as button 204 to begin searching for near users or media devices.

At step 604, the system transmits a request for progress point information to the media device. Tom's smartphone may transmit a request to Katie's tablet (e.g., through communication links such as links 524 and 526) for progress point information stored on Katie's tablet or a remote server. The request may comprise data such as an identifier associated with Tom's smartphone. The system may use the identifier to recognize Tom's smartphone as a media device belonging to a list of pre-authorized or trusted media devices. Authorization will be described in more detail in FIG. 7.

At step 606, the system receives progress point information identifying content output by the media device. Progress point information may further identify a timestamp indicative of playback progress of the content being output. Exemplary metadata fields of progress point information are shown in progress point information 106 and 112 of FIG. 1. For example, Tom's smartphone may receive progress point information similar to progress point information 106 from Katie's tablet. Although the system, at step 606, receives progress point information for content currently being output, the system may also receive progress point information for content that has been previously output. For example, Tom requests, at step 604, progress point information for a piece of content that was previously generated. The system's user interface at Tom's phone may prompt him to specify which content he wishes to request progress point information regarding, to which Tom may enter or select from a display of previously consumed content (e.g., at user interface 300).

The system may perform steps 608 and 610 in serial or in parallel. At step 608, the system identifies content providers that are offering the content. The system, based on progress point information, accesses a unique content identifier to query content providers for the corresponding content. For example, after receiving progress point information from Katie's tablet or accessing stored progress point information, the system on Tom's smartphone uses a content identifier from a metadata field within the progress point information to query content providers. If the content in question is the movie "The Flash," the system may use a unique content identifier such as an identifier from the Entertainment Identifier Registry Association (EIDR) that has been stored as a metadata field in the progress point information received from Katie's tablet. The system may use communication links from the media device to a content provider (e.g., links 526, 522, and 520 of FIG. 5) to query content providers with the unique identifier. The content provider may confirm it is offering the content by transmitting, to the media device, information such as the content itself, the price of the content, or similar content (e.g., if Netflix does not have "The Flash," but wants to offer a similar movie such as "Green Lantern"). This information obtained from the content provider will be used in step 612. Prior to step 612, the system will complete step 610 by storing the progress point information associated with a profile that is, in turn, associated with the first user. For example, the system on Tom's smartphone stores the progress point information received from Katie's tablet either locally within the memory of the smartphone or to a remote server or database (e.g., database 506 of FIG. 5) that is maintained by the service provider (e.g., service provider 504 of FIG. 5). In this case, Katie's progress point information is associated with her user account or profile maintained by the service provider that manages the system. When Tom receives her progress point information, that association may be indicated as a field in the stored version on his device (e.g., "Source Device ID" field 112*f* of FIG. 1).

At step 612, the system may generate options to display the content based on the stored progress point information and identified content providers offering the content. For example, Tom's smartphone obtains information such as the content and the playback timestamp from the progress point information to display that "The Flash" can be continued from a playback timestamp of the 56:25-minute mark. This is shown in display 306 of FIG. 3. The display 306 also exemplifies the system's generation of options corresponding to content providers offering the content identified in step 608. For example, "The Flash" is available from both OTT sources such as Netflix and YouTube, and live-broadcasting sources, such as HBO and ABC.

Steps 614 and 616 are associated with an optional feature to augment the user interface with a visual attribute to distinguish content providers that the user is subscribed to. The system, at step 614, begins the process to apply a visual attribute by identifying a content provider that the user is subscribed to of the content providers offering the content. To make this determination, the system may have previously prompted the user to provide security credentials or login credentials to log in to a content provider account through the service provider or to gain authorization to access the content provider's content or user account information (e.g., a user's Netflix account information such as subscription status). Communication between the media device and the content provider to make this determination may be done through a communication link such as links 522 and 520 in FIG. 5. If the user of the media does not have a subscription to any of the content providers offering the content, the system will not apply a visual attribute when displaying the options to play back the content. For example, if Tom is not subscribed to any OTT content providers, the user interface such as user interface 300 would not show a visual attribute distinguishing any of the content providers from the others. However, if the user does have a subscription to any of the content providers offering the content, the system will proceed to step 616 to apply a visual attribute distinguishing a content provider to which the user is subscribed. Exemplary visual attributes include a box surrounding an option, a unique color, an icon, any suitable visual indication that differentiates the appearance of the option from the way an option is routinely displayed, or a combination thereof. For example, if Tom is subscribed to Netflix, an OTT provider offering "The Flash," the system applies a box (e.g., box 310) around the displayed Netflix option in the user interface.

Figure 7:
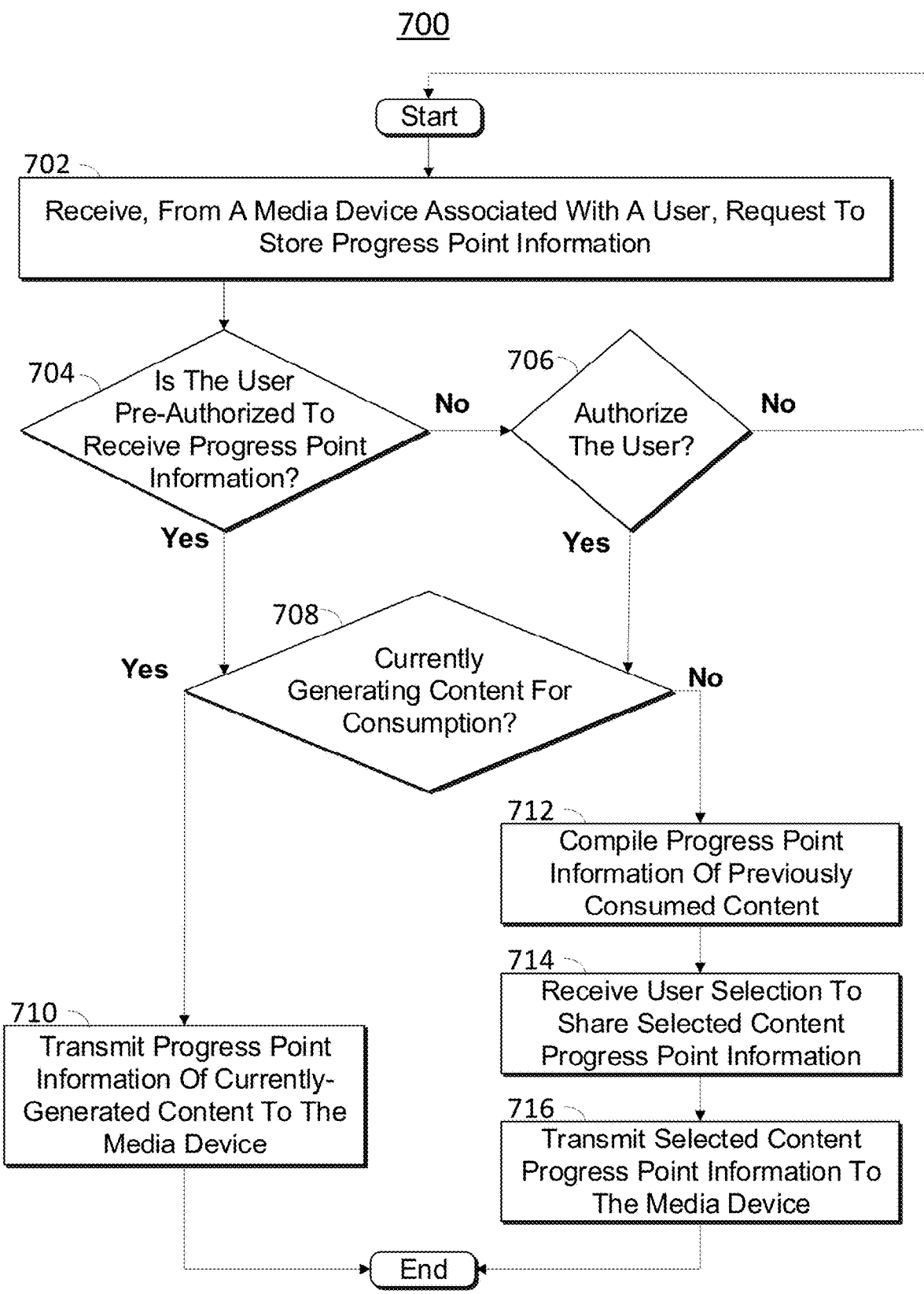
FIG. 7 depicts an illustrative flowchart of a process for sharing progress point information, in accordance with some embodiments of the disclosure.

FIG. 7 depicts an illustrative flowchart of a process 700 for sharing progress point information, in accordance with some embodiments of the disclosure. While process 600 comprises a method for requesting progress point information, process 700 comprises a method for sending or sharing progress point information. Drawing an analogy to FIG. 1, process 700 may be seen as actions taken by the system on media device 104 in response to media device 110's request for progress point information. It should be noted that the steps of process 700 may be performed by control circuitry 404 of FIG. 4, or any of the system components shown in FIGS. 1-5.

At step 702, the system receives, from a media device, a request to store progress point information. The request may be received through a communication link such as those described in the description of FIG. 5. The request for progress point information may include metadata identifying the source of the request (e.g., device ID for the media device) or the content for which progress point information is being requested (e.g., a content title or identifier). This metadata may be used in step 704, which may be an optional step allowing the system to automatically send progress point information without prompting the user to authorize. For example, if Tom is pre-authorized by Katie to access her progress point information, Katie's tablet will not prompt her through a user interface to authorize Tom's requests for progress point information. In another example, the request may include an indication of the content for which progress point information is being generated such as "'Tom_Phone' is requesting progress point information for 'Top Chef' Season 12 Episode 6."

At step 704, the system determines whether the user making the request is pre-authorized to receive progress point information. The system may use a list of pre-authorized media devices, listed by a unique identifier such as the Device ID, full name, a username, email address, or phone number as described in the description of FIG. 1, to confirm that the media device, and by association, the user of the media device, making the request are authorized. If the system determines that the user or user's device is pre-authorized, the system will proceed to step 708. Otherwise, the system proceeds to step 706. For example, the progress point synchronization system on Katie's tablet contains records that Tom or Tom's smartphone is a pre-authorized user or device, respectively. This record may be a contact list that is stored in local memory of Katie's tablet or a list that is entered by Katie and stored in the database of the service provider (e.g., database 506 of service provider 504 of FIG. 5).

At step 706, the system generates a prompt to authorize the user requesting progress point information. This may be a pop-up on any of the user interfaces as described in FIGS. 2-3. The prompt may be generated based on metadata information that was transmitted along with the request for progress point information. In one instance, the prompt to authorize a user may include the name of the device or user ID associated with the request. For example, the system generates a prompt for Katie's response that reads "Request for progress point received from 'Tom_Phone'-Accept? Yes or No" that includes the media device ID. If the user chooses not to authorize the request for progress point, the system may take no further action. Alternatively, in response to the user's choice to not authorize, the system may transmit the user's choice to the requesting user's device. The requesting user's device may change its user interface to show a message that their request was denied. For example, if Katie chose not to authorize Tom's request for her progress point information, the system sends a reflection of that choice to Tom's smartphone. The system on Tom's smartphone may choose to generate a pop-up disclosing that Katie refused to authorize his request. However, if the user chooses to authorize the requesting user and the corresponding request, the system may proceed to step 708.

At step 708, the system may determine if it is currently generating content for consumption. For example, media device 104 may determine that it is currently generating a movie on its display (e.g., generating a movie for playback on the playback interface 216 of FIG. 2). Depending on whether the media device is generating content for output currently, the system may infer the progress point information that a user is requesting. For example, if Katie is currently watching "The Flash" and the system has detected Tom is within a proximity, the system infers that Tom's request for progress point information is associated with their group viewing of "The Flash" and proceed to step 710. However, the system may be unable to make such an inference if no content is currently being generated for consumption. In such circumstances, the system may ask the user to select a specific content item for which progress point information should be shared. For example, if Tom requests progress point information from Katie after she has stopped playback of "The Flash," the system on Katie's tablet asks her to confirm, from a list of previously consumed content with Tom, which content's progress point information to share. This process is described in more detail in steps 712, 714, and 716.

At step 710, the system transmits progress point information of content that is currently generated to the device that has made the request. For example, the system on Katie's tablet transmits the requested progress point information (e.g., progress point information 106) for the currently watched movie, "The Flash," to Tom's smartphone.

Steps 712, 714, and 716 describe a method for transmitting progress point information when the system is not currently generating content for consumption. At step 712, the system compiles progress point information of previously consumed content. The system may use the metadata received in the request to determine a specific subset of progress point information of previously watched content. For example, the request includes an identifier of the requesting device, and the system may compile only previously consumed content that was consumed with the requesting device within proximity. For example, Katie's tablet shows her an option to select progress point information for "The Flash" and "Top Chef" because she and Tom have watched those two content items together. At step 714, the system receives a user selection to share selected content progress point information. Further in the earlier example, Katie may select to share progress point information for "The Flash." At step 716, the system transmits the selected content progress point information to the requesting media device. Further in the earlier example, the system may transmit, using communications circuitry in Katie's tablet, the progress point information for "The Flash" to Tom's smartphone (e.g., through intermediate communication points such as a wireless access point or through a service provider's server or directly to the device through short-range point-to-point communication as described in the description of FIG. 5).

Processes 600 and 700 for requesting and sharing progress point information may be achieved by the system without user involvement, i.e., the devices may communicate device-to-device to request and transmit progress point information automatically and periodically. For example, the system is configured such that, at a certain frequency (e.g., every 5 minutes), it may detect a user or user's media device within proximity to transmit a request for progress point information. In order to detect proximity, the system may utilize GPS and times associated with GPS data. Proximity may be determined in real time or after the fact. In some embodiments, proximity is predicted based on data that has organized two users to consume content together (e.g., a calendar), but should be verified by any of the proximity detection methods described in the description of FIG. 1. In an example of after-the-fact proximity determination, the user does not have connection to the service provider and has to synchronize progress point information when the connection (e.g., link 516) is back online. The devices may share progress point information device-to-device using a close-range point-to-point communication, but the progress point information may not be accessible until the system approves that the sources of the progress point information were within a predefined distance (e.g., based on stored GPS coordinates and respective timestamps). The system may provide, through a user interface like user interfaces 200 and 300, a button for the user to synchronize progress points from a period of time (e.g., from the last three hours) corresponding to when the user was not connected to the service provider. If a pre-authorization list (e.g., list of pre-authorized media devices as discussed above) has been established, the media device receiving the request may transmit progress point information without interrupting the user's current operation of the media device.

Figure 8:
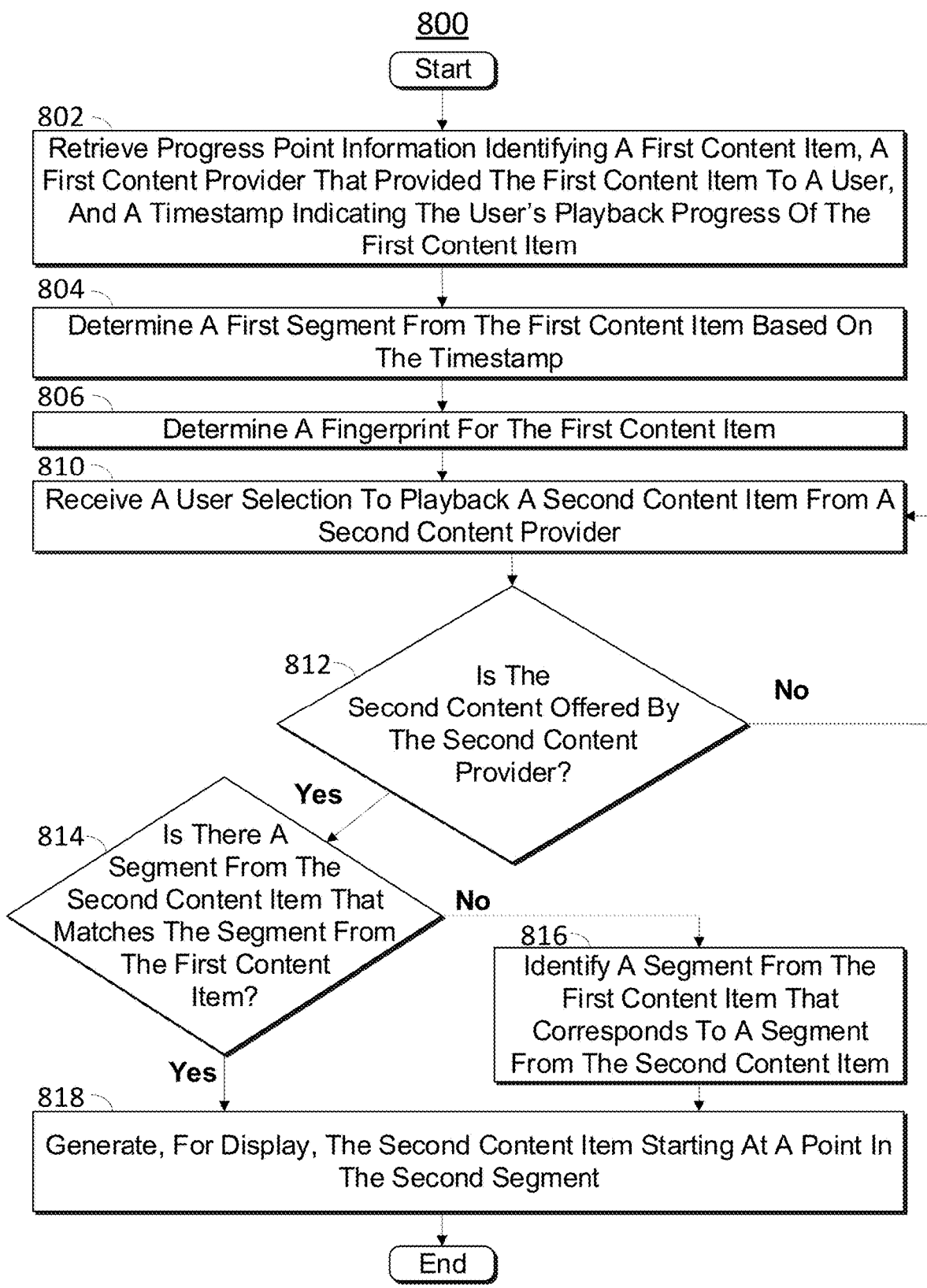
FIG. 8 depicts an illustrative flowchart of a process for reconciling playback progress between content sources, in accordance with some embodiments of the disclosure.

FIG. 8 depicts an illustrative flowchart of a process 800 for reconciling playback progress between content sources, in accordance with some embodiments of the disclosure. In circumstances where a playback timestamp of a content item from a first content provider does not play back the same segment when resumed with a different version of the content provided by a second content provider. For example, a content provider edits out certain scenes in a movie such that a playback at the 30:00-minute mark in the full movie offered by Netflix may not result in the same scene as a playback at the 30:00-minute mark on the edited movie offered by ABC. Process 800 is an exemplary method of reconciling playback progress between content sources for a situation such as the one described above. It should be noted that the steps of process 800 can be performed by control circuitry 404 of FIG. 4, or any of the system components shown in FIGS. 1-5.

At step 802, the system retrieves progress point information identifying a first content item, a first content provider that provided the first content item to a user, and a timestamp indicating the user's playback progress of the first content item. For example, the system retrieves progress point information as described in the description of FIG. 1 that identifies a movie such as "The Flash," a first content provider such as HBO, and a timestamp such as the 45:00-minute mark.

At step 804, the system determines a first segment from the first content item based on the timestamp. A content item may be composed of segments (e.g., scenes in a movie) which may have their own identifiers (e.g., each scene in a movie has a hash value identifying it among other scenes in the movie). A playback timestamp saved in progress point information may also correspond to a scene and respective hash value, which may be saved as additional metadata fields in the progress point information. For example, the 45:00-minute mark of the movie "The Flash" corresponds to a scene identified by a unique hash ID.

At step 806, the system determines a fingerprint for the first content item. Although content items can be identified by a title, series number, episode number, or a combination thereof, a fingerprint is determined to uniquely identify the content item among existing content items accessible through Internet databases. For example, EIDR offers a universal unique identifier for movie and television assets that may be used as a fingerprint for content items that are related to movies and television. Further in the previous example, the movie "The Flash" may have a fingerprint that is determined from the EIDR database.

At step 810, the system receives a user selection to play back a second content item from a second content provider. When resuming playback, the user may not be able to access the first content provider (e.g., the user has terminated a previously active subscription to the first content provider), and instead, may choose a second content provider that may have its own version of the first content item and hence is denoted as "the second content item." Alternatively, the user may need to select a different version of the first content from a second content provider to fulfill certain viewing requirements. For example, the user is with a child who should see the content from a content provider that edits the content according to parental advisory guidelines (e.g., the second content item is a version of the first content item that has less violence or inappropriate language). The system may determine, in advance, content providers that are offering the content for playback, or the user may specify a desired provider that the system will query to determine if the desired provider is offering the content. As depicted in process 800, the system does not perform a determination in advance if content providers offer the content, which necessitates step 812.

At step 812, the system determines if the second content item is offered by the second content provider. A service provider may save the content items which a user has previously consumed or for which the user has registered to resume later playback, and the system may be communicatively coupled with the service provider to access saved content items when querying content providers for content. Furthermore, the service provider may maintain an up-to-date mapping of a content item to the content providers offering it. If the second content provider does not offer the second content, the system may prompt the user to select another content provider and return to step 810. For example, if the user has selected to watch "The Flash" from Hulu, and Hulu does not offer that movie, the system displays an error message, prompt the user to select another content provider, suggest a list of content providers that do offer the content, or any combination thereof. Alternatively, if the second content provider does not offer a version of the content associated with the stored progress point information, the system may determine which content provider does offer the same version of the content. This may be done by comparing identifiers of segments in content (e.g., matching segments by identifiers as discussed subsequently) to determine if two versions of content are the same. The term "same version" may be understood to mean having the same production edits (e.g., audio, video frames, resolution quality, etc.). If the second content is offered by the second content provider, the system may proceed to step 814.

At step 814, the system may determine if there is a segment from the second content item that matches the segment from the first content item. To provide the appropriate timestamp to resume content, the system may determine that the same segment exists in both the first and second media contents. For example, Netflix and HBO may have variations of the movie, "The Flash," but have a common scene, corresponding to a timestamp in stored progress point information, where the protagonist is fighting a nemesis. The progress point information may provide an indication that the playback timestamp of the 45:00-minute mark corresponds to a scene with an exemplary playback identifier of "218nuw_19_120," where "218nuw" may be an identifier for the movie, "19" may be an identifier for the 19th scene, and "120" may correspond to the 45:00-minute mark (e.g., 120 seconds into the 19th scene is 45 minutes from the beginning of the movie). The playback identifier "218nuw_19_120" may be stored as a metadata field in the progress point information. The system may receive playback identifier information from content providers that access a database of metadata for each content, including a list of playback identifiers. If this scene identifier is associated with both the first and second content items, the system may proceed to step 818. However, if the playback identifier "218nuw_19_120" associated with the first content item is not in the second content item's list of playback identifiers (e.g., the second content provider edited out the scene in their version of the movie to allow more time for commercial breaks), the system is unable to use playback identifier "218nuw_19_120" to resume playback with the second content item at the appropriate time. As a result of its inability to match a segment from the second content item to a segment from a first content item, the system may proceed to step 816 to find a scene that is appropriate to resume playback from.

The system may, at step 814, also identify a segment from the second content item that matches the segment from the first content item by comparing frames from both content items. The term "frames" will be understood to refer to consecutive components of sound or images such as audio frames, visual frames, or a combination thereof that compose media content such as a recorded song or video. The system may extract frames from a segment from the first content item that correspond to a portion of the first content item identified by progress point information. A second content item may be separated into segments, where each segment comprises frames. To find the matching segment between the first content item and the second content item, the system compares the extracted frames from the first content item to frames of each of the segments from the second content item.

At step 816, the system identifies a segment from the first content item that corresponds to a segment from the second content item. In circumstances where the timestamp associated with a segment from a first content item does not correspond to the timestamp of a matching segment in a second content item (e.g., the scene at the 45:00-minute mark in one version of a movie is not the same scene as the scene at the 45:00-minute mark in a second version of the movie), the system may identify a segment that occurs prior to the segment from the first content. For example, if a first content item is associated with a playback identifier of "218nuw_19_120" as previously described, the system decides to resume playback from a scene in the second content item corresponding to playback identifier "218nuw_18_000" (e.g., the second content item does not have scene 19 but the latest scene of the earliest scenes available from the second content provider is scene 18). A segment prior to the desired playback segment is one example of a segment corresponding to another segment. The system may also find corresponding segments through shared attributes such as a common actor, genre, storyline, any suitable descriptor of a content item segment, or a combination thereof.

At step 818, the system generates, for display, the second content item starting at a point in the second segment. The point may be the exact playback timestamp from the retrieved progress point information. The system may determine the point in the second segment based on user preferences (e.g., a dislike for violent content, a preferred actor, a desire to view highlights). For example, the system generates "The Flash" on YouTube at exactly the 45:00-minute mark for Tom to view after determining that the HBO version that Katie watched had a matching segment at that timestamp. Alternatively, the system may generate "The Flash" for viewing at the 30:00-minute mark because the YouTube version cut out the scene at the 45:00-minute mark and HBO did not.

It should be noted that processes 600-800 or any step thereof could be performed on, or provided by, any of the devices shown in FIGS. 1-5. For example, the processes are executed by control circuitry 404 (FIG. 4) as instructed by an application implemented on media device 512 and/or server 504. In addition, one or more steps of a process may be incorporated into or combined with one or more steps of any other process or embodiment (e.g., steps from process 600 may be combined with steps from process 700). In addition, the steps and descriptions described in relation to FIGS. 6-8 may be done in alternative orders or in parallel to further the purposes of this disclosure. For example, each of these steps is performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for playback of a content, the method comprising:
   receiving, from a first media device, a request for progress point information of the content;
   detecting that a second media device is within a predefined proximity of the first media device, wherein the second media device is different from the first media device;
   in response to detecting that the second media device is within the predefined proximity of the first media device, transmitting, to the second media device, the request for the progress point information;
   receiving, from the second media device, progress point information identifying content output by the second media device;
   receiving, from the first device, a selection of the option to play the content based on the progress point information identifying content output by the second media device;
   determining a resume point on the progress point information; and
   resuming the content at the first media device at the determined resume point.

2. The method of claim 1 wherein the first media device is associated with a first user and a second media device is associated with a second user, wherein the first user is different from the second user.

3. The method of claim 2 further comprising:
   storing the progress point information in association with a second user profile associated with the second user.

4. The method of claim 3 wherein the resume point is determined based on the stored progress information in association with the second user profile.

5. The method of claim 1 further comprising:
determining that the content is currently being generated for display at the second media device.

6. The method of claim 1, wherein detecting that the second media device is within the predefined proximity of the first media device comprises:
retrieving first location data associated with the first media device, wherein the first location data includes geographical information and time information;
retrieving second location data associated with the second media device, wherein the second location data includes geographical information and time information; and
correlating the first location data with the second location data.

7. The method of claim 1 further comprising:
selecting the second media device among a plurality of media devices, wherein each of the plurality of media devices is within the pre-defined proximity of the first media device.

8. The method of claim 7 further comprising:
periodically broadcasting the request to the plurality of media devices.

9. The method of claim 1 wherein the progress point information further identifies a timestamp indicating progress of the content.

10. The method of claim 9 wherein the resume point is determined based on the timestamp.

11. A system for playback of a content, the system comprising:
a memory; and
a control circuitry communicably coupled to the memory, wherein the control circuitry is configured to:
receive, from a first media device, a request for progress point information of the content;
detect that a second media device is within a predefined proximity of the first media device, wherein the second media device is different from the first media device;
in response to detecting that the second media device is within the predefined proximity of the first media device, transmit, to the second media device, the request for the progress point information;
receive, from the second media device, progress point information identifying content output by the second media device;
receive, from the first device, a selection of the option to play the content based on the progress point information identifying content output by the second media device;
determine a resume point on the progress point information; and
resume the content at the first media device at the determined resume point.

12. The system of claim 11 wherein the first media device is associated with a first user and a second media device is associated with a second user, wherein the first user is different from the second user.

13. The system of claim 12 wherein the control circuitry is configured to:
store the progress point information in association with a second user profile associated with the second user.

14. The system of claim 13 wherein the resume point is determined based on the stored progress information in association with the second user profile.

15. The system of claim 11 wherein the control circuitry is configured to:
determine that the content is currently being generated for display at the second media device.

16. The system of claim 11, wherein the control circuitry is configured to:
retrieve first location data associated with the first media device, wherein the first location data includes geographical information and time information;
retrieve second location data associated with the second media device, wherein the second location data includes geographical information and time information; and
correlate the first location data with the second location data.

17. The system of claim 11, wherein the control circuitry is configured to:
select the second media device among a plurality of media devices, wherein each of the plurality of media devices is within the pre-defined proximity of the first media device.

18. The system of claim 17 wherein the control circuitry is configured to:
periodically broadcast the request to the plurality of media devices.

19. The system of claim 11 wherein the progress point information further identifies a timestamp indicating progress of the content.

20. The system of claim 19 wherein the resume point is determined based on the timestamp.

* * * * *